C. J. SCHMALZRIED.
AUTOMOBILE LAMP.
APPLICATION FILED JAN. 14, 1909.
949,846.
Patented Feb. 22, 1910.
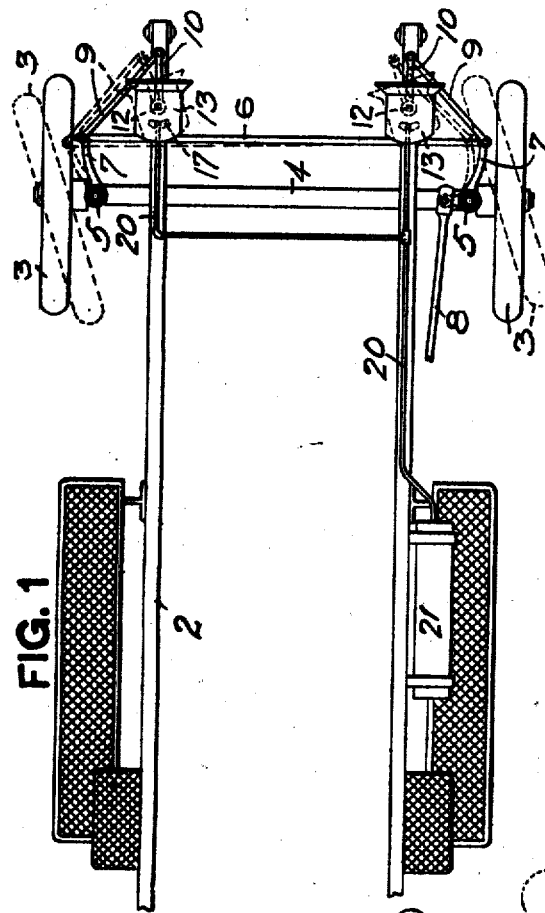
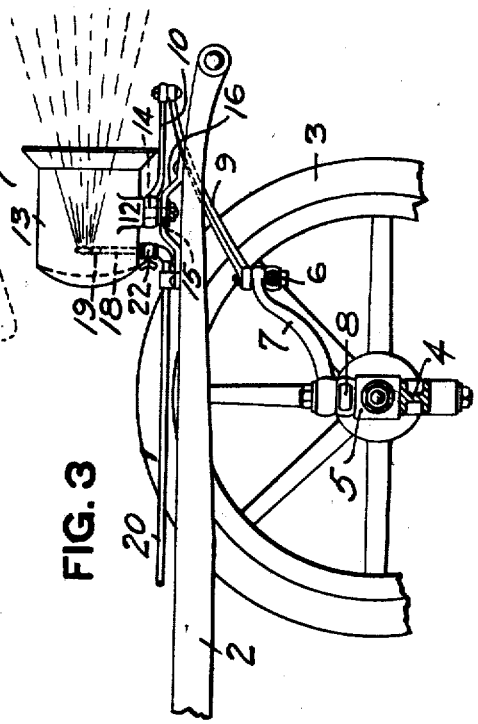
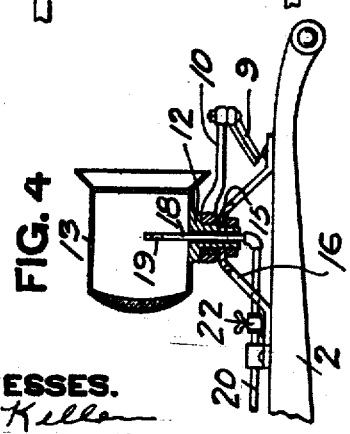
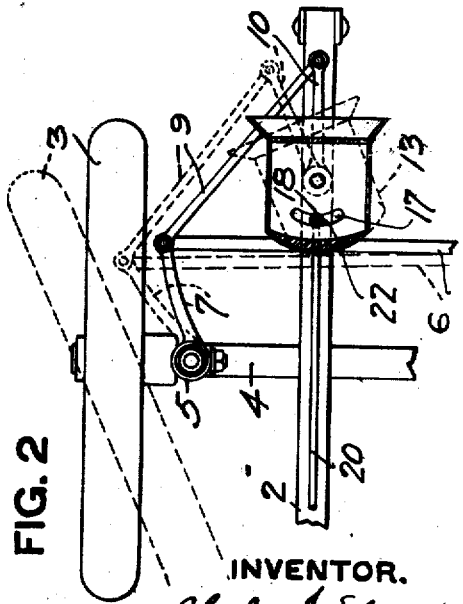
WITNESSES.
INVENTOR.

UNITED STATES PATENT OFFICE.

CHARLES J. SCHMALZRIED, OF KNOXVILLE, PENNSYLVANIA.

AUTOMOBILE-LAMP.

949,846.  Specification of Letters Patent.  Patented Feb. 22, 1910.

Application filed January 14, 1909. Serial No. 472,360.

*To all whom it may concern:*

Be it known that I, CHARLES J. SCHMALZRIED, a resident of Knoxville, in the county of Allegheny and State of Pennsylvania, have invented a new and useful Improvement in Automobile-Lamps; and I do hereby declare the following to be a full, clear, and exact description thereof.

My invention relates to automobile lamps. The object of my invention is to provide a lamp for automobiles or like vehicles in which the reflectors or lamp bodies may be connected up with the steering gear in such manner as to direct the light in the same direction that the wheels are steered while at the same time the flame itself remains stationary, thereby dispensing with the movement of the flame and so obviating the jarring or the agitating of the flame when the lamp bodies are turned and consequently giving a steadier light.

To these ends my invention consists, generally stated, in a swiveled body, connections between the lamp body and the steering mechanism, whereby the lamp is directed in the same direction as the wheels, and a burner independent of the lamp body, whereby the lamp body may be turned without any movement on the part of the burner.

Referring to the drawings Figure 1 is a plan view of a portion of an automobile showing my invention applied thereto; Fig. 2 is an enlarged plan view of one end of steering gear and a lamp; Fig. 3 is a side view of the steering mechanism and lamps; and Fig. 4 shows a modification.

Referring to the drawings the numeral 2 designates a portion of the frame or chassis of an automobile largely shown as diagrammatic, supported on the wheels 3. The wheels are connected to the axle 4 by means of the ordinary pivotal joint 5. A rod 6 connects the arms 7 forming the steering frame and this frame is operated by the steering lever 8. The lever arms 9 are connected to the steering frame, said arms being connected at their outer ends to the short arms 10 which are connected to the stud 12 on the lamp body 13. This stud 12 has the pin 14 which is swiveled in a seat or recess 15 in the strut 16 on the frame of the automobile. From the above it will be apparent that as the steering lever 8 is moved to throw the wheels 3 in the desired direction, at the same time the steering frame will act through the arms 9 and connections therefrom to the lamps to direct the lamps in the same direction as the wheels.

The lamp body 13 is provided with the slot 17 through which passes the pipe 18 at the upper end of which is the burner 19. A rigid pipe 20 leads from the gas tank 21 to the pipe 18 and the valve 22 controls the supply of gas to the burner. This burner may be of any suitable construction, that shown being of the ordinary type.

It is customary to employ acetylene gas for use in the burner 19 and this gas may be stored in the tank 21 and supplied to the burner as needed by the operation of the valve 22.

In Fig. 4 I have illustrated a modified form of my invention in which the stud 12 has a passage extending through it through which the pipe 18 passes. By this construction the slot 17 in the lamp body is dispensed with. The lamp body 13 is free to turn easily upon the pipe.

From the above construction it will be observed that the lamp body is mounted to turn in the desired direction according to the direction which the wheels take, while the burner remains stationary. In consequence the flame is not agitated or caused to flicker by the sudden movement of the lamp body, but owing to the stationary condition of the burner the flame remains steady and unaffected by the movement of the lamp body. Furthermore, by this construction I am enabled to employ a permanent pipe connection between the tank and the burner instead of employing flexible tubing which is short lived, and furthermore, its use is attended with more or less danger due to leakage. The lamp bodies being entirely independent of the burner the lamp bodies may be removed and cleaned, and as there are no permanent burner fixtures within the lamp the cleaning is effected with less difficulty.

What I claim is:

1. In an automobile lamp, the combination of a swiveled lamp-body, connections between said lamp-body and the steering gear, and a gas burner extending up within said lamp-body and supported independently thereof whereby the burner remains stationary.

2. In an automobile lamp, the combination of a swiveled lamp-body, connections between said lamp-body and the steering gear, and a gas burner extending up within said lamp-body at the point of swiveling and supported independently of said lamp body, whereby the burner remains stationary.

3. In an automobile lamp, the combination of a lamp-body, connections between said lamp-body and the steering gear, a hollow swiveling pin on which said lamp-body turns, and a gas burner extending up through said pin and supported independently of said lamp-body.

In testimony whereof, I the said CHARLES J. SCHMALZRIED have hereunto set my hand.

CHARLES J. SCHMALZRIED.

Witnesses:
ROBERT C. TOTTEN,
J. R. KELLER.